United States Patent [19]

Liska

[11] Patent Number: 4,632,641

[45] Date of Patent: Dec. 30, 1986

[54] PUMP ARRANGEMENT FOR HYDRAULIC INSTALLATIONS

[75] Inventor: Georg Liska, Durlach-Zimmerbach, Fed. Rep. of Germany

[73] Assignee: Zahnradfabrik Friedrichshafen, AG., Friedrichshafen 1, Fed. Rep. of Germany

[21] Appl. No.: 604,659

[22] PCT Filed: Jun. 15, 1983

[86] PCT No.: PCT/EP83/00155

§ 371 Date: Apr. 24, 1984

§ 102(e) Date: Apr. 24, 1984

[87] PCT Pub. No.: WO84/01003

PCT Pub. Date: Mar. 15, 1984

[30] Foreign Application Priority Data

Aug. 27, 1982 [DE] Fed. Rep. of Germany ....... 3231878

[51] Int. Cl.$^4$ .............................................. F04B 1/04
[52] U.S. Cl. ..................................... 417/273; 417/279
[58] Field of Search ................... 417/199 R, 201, 206, 417/273, 301, 250, 279

[56] References Cited

U.S. PATENT DOCUMENTS

| 368,691 | 8/1887 | See | 417/174 |
|---|---|---|---|
| 1,969,881 | 8/1934 | Gardner | 415/53 X |
| 2,666,393 | 1/1954 | Trogei et al. | 417/202 |
| 3,389,660 | 6/1968 | Hearstrum et al. | 417/202 |
| 3,542,496 | 11/1970 | Bergeson | 415/198.2 |
| 3,932,057 | 1/1976 | Wadensten | 417/53 X |
| 4,310,289 | 1/1982 | Merz | 417/87 |
| 4,378,195 | 3/1983 | Gamell | 415/90 |
| 4,478,550 | 10/1984 | Watanabe | 417/53 X |

Primary Examiner—Carlton R. Croyle
Assistant Examiner—Paul F. Neils
Attorney, Agent, or Firm—Zalkind & Shuster

[57] ABSTRACT

A pump and a centrifugal impeller are arranged so that the pump has a suction line in which the centrifugal impeller is installed effecting a countercurrent opposite to the suction feed flow direction to the pump. The effect is to regulate the pump flow responsive to the speed of the centrifugal impeller so that the pump output flow decreases with rising pump speed.

9 Claims, 3 Drawing Figures

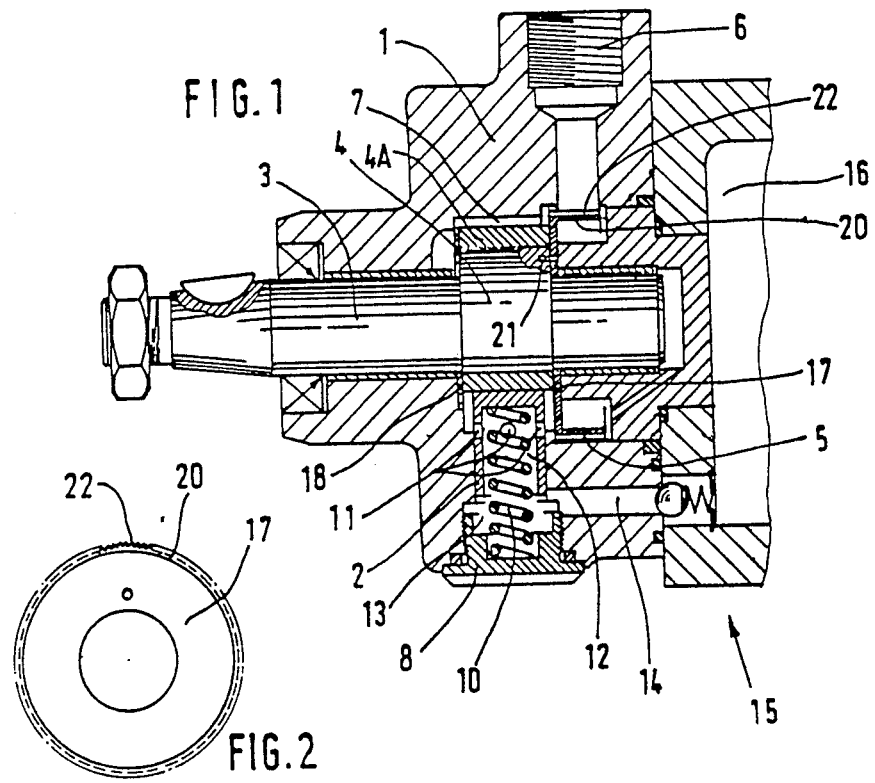
FIG.1
FIG.2
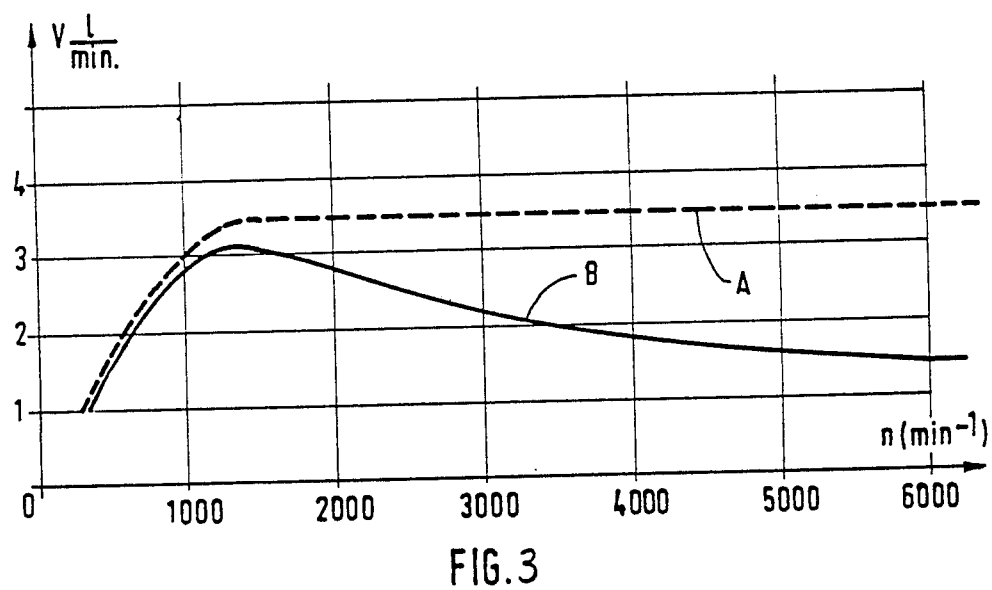
FIG.3

PUMP ARRANGEMENT FOR HYDRAULIC INSTALLATIONS

BACKGROUND OF THE INVENTION

Conventional pumps have a rising discharge characteristic directly responsive to pump speed. Pumps of that kind may be vane or gear pumps. Such pumps may be used for applicant's purpose in hydraulic installations where it is not material that increase in speed is not effective to reduce pump discharge, i.e., increase in discharge with increase in speed may be desired in some circumstances. In such systems pressure is limited by a valve to permit excess discharge to bypass the oil tank.

Radial piston pumps are well known as exemplified in German Pat. No. 29 02 240 and are used for the advantage of an operating characteristic wherein outlet discharge is reduced inversely as pump speed rises, an effect caused by throttling the suction feed to the pump. However, the regulation point of the outlet flow is at a relatively low speed of about 1200 RPMs and then remains almost constant.

Where such a pump is used in booster steering systems of motor vehicles a decreasing pump output characteristic is desirable as the speed of the vehicle increases. Thus, the pump which is driven by engine speed has an increase in speed and at such times a reduced discharge of pressure oil is desired. By effecting such inverse response a vehicle traveling at high speeds at which no large steering deflections are needed, booster steering is improved in driving characteristic when the boost steering system is in use since the driver has a better feel of contact with the road bed, a very desirable condition.

It has heretofore been known from German patent OS No. 29 06 047 (FIG. 3) to provide an electrical throttling valve in the discharge line of a booster steering pump which valve automatically effects throttling of discharge responsive to an electrical signal corresponding to travel speed of the vehicle. Accordingly, an electrical control throttle valve controls pressure oil to a consumer device such as a power cylinder in such a way that in case of slow travel the full pump discharge is available. However, in the case of fast travel the pump discharge is greatly decreased whereby excess oil flows back into the oil tank. A throttle arrangement control of the pump as described is expensive and operates in combination with a pump which has no regulation of suction feed and particularly at higher speeds has a relatively high leakage current.

BRIEF DESCRIPTION OF THE INVENTION

In order to provide as simple as possible pump arrangement with least expense having an inverse characteristic line wherein discharge drops with increasing speed, the combination of a radial multi piston pump with a centrifugal impeller in series with the suction feed to the piston pump is provided. Centrifugal impeller pump has a discharge in a direction providing a countercurrent to the direction of suction feed to the piston pump. This causes development of a dynamic pressure in the suction line which opposes inlet feed to the pump and results in a dropping characteristic of discharge inversely to speed of the centrifugal impeller.

Inasmuch as the speed of the suction throttling pump is a direct function of vehicle speed, it is apparent that increasing vehicle speeds will result in decreasing discharge to a power steering cylinder, the effect desired to be achieved.

In construction the centrifugal impeller consists merely of a collar having a serrated exterior and which is carried by the piston pump cam by means of an intermediate disc. Thus, the collar rotates at shaft speed and the serrated surface of the collar effects a centrifugal countercurrent action in a narrow annular recess connecting with the suction line of the pump housing and the suction chamber of the piston pump. The construction provides a countercurrent in the suction line in a power saving manner which is free of wear since no moving parts of the centrifugal impeller are in engagement with any surfaces and a high operational safety is effected.

BRIEF DESCRIPTION OF THE DRAWING FIGURES

A detailed description of the invention now follows in conjunction with the appended drawing in which:

FIG. 1 is a longitudinal cross section through the combination.

FIG. 2 is a radial section through the centrifugal impeller.

FIG. 3 is a diagram showing characteristics of a conventional pump as compared with the pump of the invention for discharge rate as a function of speed.

FIG. 1 shows the essential components of the invention which comprises a radial piston pump of conventional construction having, e.g., three pistons such as piston 2 within a housing 1. An engine driven pump shaft 3 carries a pump cam 4 with a bearing 4A for operating the pistons, thus, for each rotation of cam 4 the pistons are reciprocated, as well understood. Cam 4 rotates in a suction chamber 7 communicating via a housing recess or annular chamber 5 with a suction passage 6 in the housing. Respective compression springs 10 backed by caps 8 threaded into the housing maintain the pistons against cam 4. The pistons project into suction chamber 7 and have inlet openings 11 for oil intake into the piston interiors 12 and piston chambers 13 of the housing whence on pressure strokes the pistons force oil in respective pressure outlet passages 14. Passages 14 connect via respective outlet check valves 15 with a pressure chamber 16 for connection to a consumer. The preceding description is all well known for radial piston pumps.

Carried by the one radial piston pump cam 4, is a disc 17 which carries a collar 20 that constitutes a centrifugal impeller element. Disc 17 is secured to cam 4 by a pin 21 and rotates therewith, thus being carried thereby on shaft 3.

Collar 20 has a serrated exterior, such as serrations 22 (FIG. 2) which when rotated in surrounding oil has a centrifugal countercurrent flow effect. Rotation of collar 20 effects a rotary stream in the surrounding narrow annular chamber which effects a dynamic pressure against incoming suction flow.

Although FIG. 2 shows a generally serrated surface, it will be appreciated that grooves, blades, or other shapes of pumping elements capable of motivating surrounding oil are usable for the purposes of the invention. Also, the countercurrent action can be determined by the size, e.g., diameter of collar 20, and the number and shape of the elements on the periphery of the collar, all a matter of simple design.

Further, the collar 20 can be eliminated, by utilizing a larger diameter disc 17 with a suitable serrations 22, grooves, or blades on the radial surface thereof, facing the cam but extending radially marginally therefrom, with suitable redesign, of course, of the housing to accommodate the enlarged disc.

Alternatively, the side of the disc facing recess 5 may be provided with serrations 22 or other oil conveying elements.

In any event an advantage of using a disc 17 resides in the fact that it is a cheek plate for cam 4, as well as a thrust washer against the radial end of the housing hub that supports an end of shaft 3. A cheek plate 18 is utilized at the opposite end of cam 4.

The graph of FIG. 3 shows a characteristic curve A for a conventional radial piston pump, the discharge in liters per minute on the ordinate against the pump RPM on the abscissa. There is slight regulation in the rising curve from below 1000 RPM up to approximately 1200 RPM, but thereafter the discharge rate is practically constant. However, with the combined pump and impeller of the invention as described herein, at about the same 1200 RPM, regulation commences with a pronounced and constant dropping of discharge rate as shown by curve B.

I claim:

1. A pump having suction flow means leading thereto;
   a suction flow opposing means in said suction flow means which comprises a centrifugal impeller disposed to produce opposition to said suction flow for reduction thereof with speed increase of said centrifugal impeller for discharge regulation of said pump; and means whereby the speed of said centrifugal impeller increases with the speed of said pump.

2. The combination of a pump having a suction flow side and a centrifugal impeller in series connection with said suction flow side and comprising means operative to effect rotation with said pump to effect an opposing flow to the suction flow to said pump for discharge regulation thereof inversely to the speed of said impeller for decreasing the discharge of said pump with increasing speed of said impeller.

3. The combination as set forth in claim 2, said pump and said impeller being driven on a common drive shaft.

4. The combination as set forth in claim 2, said impeller being of smaller discharge capacity than said pump.

5. The combination as set forth in claim 4, said pump and said impeller being driven on a common drive shaft.

6. The combination of a pump having a suction side and a mechanically driven centrifugal impeller disposed intermediate said suction side and a suction passage (6) and being operative to effect a flow opposing the suction flow to said pump for discharge regulation thereof inversely of the speed of said centrifugal impeller for decreasing the discharge of said pump with increasing speed of said centrifugal impeller; said centrifugal impeller comprising a rotary member having a vaned periphery disposed across said suction passage; rotation of said centrifugal impeller effecting said flow opposing said suction flow to said pump.

7. The combination of a pump having a suction side and a centrifugal impeller in series connection with said suction side and a fluid source, and comprising means operative to effect pump regulation inversely to the speed of said centrifugal impeller for decreasing the discharge of said pump with increasing speed of said centrifugal impeller, said pump being of multi-piston type comprising a cam (4) mounted on a drive shaft (3) for actuating pumping pistons:

the improvement wherein said centrifugal impeller comprises a member (20) rotative with said shaft and having elements (22) effecting a countercurrent in said suction side upstream of said pump.

8. In a combination as set forth in claim 7, said member (20) comprising a collar having a serrated exterior surface (22) and support means whereby said collar is secured to said cam for rotation therewith;
   including a housing for said impeller having a chamber (5) in which said collar rotates; said housing having an inlet suction port communicating with said chamber; said impeller being peripherally spaced from the wall of said chamber whereby an annular flow chamber is effected; said pump having a suction chamber (7) communicating with said annular chamber; said impeller effecting said countercurrent in said annular chamber.

9. In a combination as set forth in claim 8, said support means comprising a disc (17) secured to said cam and concentrically carrying said collar;
   said housing having a hub surrounding said drive shaft engaged by said disc for axial force support of said cam.

* * * * *